United States Patent
Tsuchimoto

(10) Patent No.: US 10,231,467 B2
(45) Date of Patent: Mar. 19, 2019

(54) SOLID FERMENTED SOY MILK PRODUCT AND PROCESS FOR MANUFACTURING SAME

(71) Applicant: Sapporo Holdings Limited, Shibuya-ku (JP)

(72) Inventor: Norihiko Tsuchimoto, Shibuya-ku (JP)

(73) Assignee: Sapporo Holdings Limited, Tokyo (JP)

( * ) Notice: Subject to any disclaimer, the term of this patent is extended or adjusted under 35 U.S.C. 154(b) by 330 days.

(21) Appl. No.: 14/648,820

(22) PCT Filed: Jan. 8, 2014

(86) PCT No.: PCT/JP2014/050137
§ 371 (c)(1),
(2) Date: Jun. 1, 2015

(87) PCT Pub. No.: WO2014/119343
PCT Pub. Date: Aug. 7, 2014

(65) Prior Publication Data
US 2015/0296823 A1    Oct. 22, 2015

(30) Foreign Application Priority Data

Feb. 4, 2013  (JP) .................................. 2013-019448

(51) Int. Cl.
*A23C 11/10* (2006.01)
*A23C 20/02* (2006.01)
(Continued)

(52) U.S. Cl.
CPC .......... *A23C 11/106* (2013.01); *A23C 20/025* (2013.01); *A23L 2/382* (2013.01);
(Continued)

(58) Field of Classification Search
None
See application file for complete search history.

(56) References Cited

U.S. PATENT DOCUMENTS 3,535,117 A    10/1970  Yamanaka et al.
3,585,047 A    6/1971   Fujimaka et al.
(Continued)

FOREIGN PATENT DOCUMENTS

CN    100581369 C    1/2010
CN    102687752 A    9/2012
(Continued)

OTHER PUBLICATIONS

Loginova et al. "Content of free amino acids in peptone and the dynamics of their consumption in the microbiological synthesis of dextrin", Pharmaceutical Chemistry Journal Apr. 1974, vol. 8, Issue 4, pp. 249-251.*
Yasuichi et al. JP 2012249578—English Translation, pp. 1-17.*
Moeko et al. JP2012036158—English Translation pp. 1-13.*
Written Opinion dated Aug. 3, 2015 in Singaporean Patent Application No. 11201406339Q.
(Continued)

*Primary Examiner* — Nikki H. Dees
*Assistant Examiner* — Amber M Cox
(74) *Attorney, Agent, or Firm* — Morgan, Lewis & Bockius LLP

(57) ABSTRACT

The invention relates to a process for manufacturing a solid fermented soy milk product, comprising a fermentation step in which a fermentation substrate containing soy milk and with adjusted malic acid and free amino acid concentrations, is fermented with heterofermentative lactic acid bacteria.

20 Claims, 1 Drawing Sheet

(51) Int. Cl.
　　　*A23L 2/38*　　　(2006.01)
　　　*A23L 2/39*　　　(2006.01)
　　　*A23L 2/66*　　　(2006.01)
　　　*A23L 11/00*　　(2016.01)
　　　*A23L 33/10*　　(2016.01)
　　　*A23L 33/185*　　(2016.01)

(52) U.S. Cl.
　　　CPC .................. *A23L 2/39* (2013.01); *A23L 2/66* (2013.01); *A23L 11/09* (2016.08); *A23L 33/10* (2016.08); *A23L 33/185* (2016.08); *A23Y 2220/13* (2013.01); *A23Y 2220/29* (2013.01); *A23Y 2240/75* (2013.01)

(56) References Cited

U.S. PATENT DOCUMENTS

| | | | |
|---|---|---|---|
| 3,937,843 | A | 2/1976 | Osaka et al. |
| 5,342,641 | A | 8/1994 | Masutake et al. |
| 6,548,057 | B1 * | 4/2003 | Shimakawa .......... A23C 11/106 424/439 |
| 2003/0194468 | A1 | 10/2003 | Konkoly et al. |
| 2005/0244559 | A1 | 11/2005 | Kato et al. |
| 2009/0252709 | A1 * | 10/2009 | Nose .......................... A23L 2/52 424/93.4 |
| 2009/0280217 | A1 * | 11/2009 | Katase ..................... A23J 3/16 426/63 |
| 2010/0272859 | A1 | 10/2010 | Given |
| 2010/0291051 | A1 | 11/2010 | Segawa et al. |
| 2011/0059212 | A1 | 3/2011 | Hasegawa |
| 2015/0164098 | A1 | 6/2015 | Tsuchimoto et al. |

FOREIGN PATENT DOCUMENTS

| | | |
|---|---|---|
| EP | 0 521 707 A1 | 1/1993 |
| EP | 2 269 471 A1 | 1/2011 |
| JP | 48-1188 B1 | 1/1973 |
| JP | 5-7458 | 1/1993 |
| JP | 7-147898 A | 6/1995 |
| JP | 2510435 | 6/1996 |
| JP | 2001-190254 | 7/2001 |
| JP | 2002-262771 A | 9/2002 |
| JP | 2003-284520 A | 10/2003 |
| JP | 2004-16215 A | 1/2004 |
| JP | 2004-215529 | 8/2004 |
| JP | 2004-261139 | 9/2004 |
| JP | 2005-531313 A | 10/2005 |
| JP | 2007-68410 | 3/2007 |
| JP | 2008-220301 | 9/2008 |
| JP | 2012-36158 A | 2/2012 |
| JP | 2012-249578 A | 12/2012 |
| WO | WO 2006/135089 A1 | 12/2006 |
| WO | WO 2009/131052 A1 | 10/2009 |
| WO | WO 2013/150887 A1 | 10/2013 |

OTHER PUBLICATIONS

Kyung-Hee Kim, et al., "Effects of Protease Treatment of Soy Milk on Acid Production by Lactic Acid Bacteria and Quality of Soy Yogurt" Korean J. Food Sci. Technol., vol. 21, No. 1, 1989, pp. 92-99 (with English Abstract).
International Preliminary Report on Patentability dated Aug. 13, 2015 in International Application PCT/JP2014/050137, filed on Jan. 8, 2014 (English translation only).
Written Opinion dated Jan. 27, 2016, in corresponding Singapore Patent Application No. 11201504675S.
Office Action dated Feb. 11, 2016 in co-pending U.S. Appl. No. 14/390,475.
Office Action dated Dec. 28, 2016 in co-pending U.S. Appl. No. 14/390,475.
Office Action dated Dec. 19, 2016 in Canadian Patent Application No. 2,869,292.
Barry A. Law, et al., "Proteolytic systems in lactic acid bacteria," Antonie van Leeuwenhoek, vol. 49, (1983), pp. 225-245.
International Search Report dated Apr. 15, 2014 in PCT/JP2014/050137.
Office Action dated Oct. 16, 2015 in Canadian Patent Application No. 2,869,292.
Japanese Office Action dated Dec. 2, 2014, in Japan Patent Application No. 2012-086401.
International Preliminary Report on Patentability with Written Opinion dated Oct. 16, 2014, in International Application No. PCT/JP2013/057668.
Japanese Office Action dated Jul. 8, 2014, in Japan Patent Application No. 2013-019492.
International Search Report dated Jun. 18, 2013, in International Application No. PCT/JP2013/057668.
Japanese Office Action dated Oct. 3, 2014, in Japan Patent Application No. 2013-19492 (with Partial English translation).
Hideyuki Suzuki, et al., "Development of a Method of Eliminating Soy Bean Smell with Lactic Acid Bacteria", Soy Protein Research, vol. 12, No. 30, 2009 pp. 75-77 (with partial English translation).
Young-Tae Ko, "Acid Production by Lactic Acid Bacteria in Soy Milk Treated by Microbial Protease or Papain and Preparation of Soy Yogurt", Korean J. Food Sci. Technol., vol. 21, No. 3, 1989, pp. 379-386 (with English Abstract).
Yuichi Nodake, et al., "Effects of the Fermented Product Cultivated from Soybean Milk Using Lactic Acid Bacteria, PS-B1, on Liver Function and Lipid Metabolism", Journal for the Integrated Study of dietary Habits, vol. 22, 2011, pp. 13-19 (with partial English translation).
Akihiro Nakamura, "Development of Soybean Soluble Polysaccharide Derived from "Okara", and Application as a Functional Food Ingredient", Nippon Shokuhin Kagaku Kogaku Kaishi, vol. 58, No. 11, 2011, pp. 559-566 (with Partial English translation).
Office Action issued in corresponding Canadian Patent Application No. 2950367 dated Jul. 23, 2018.

* cited by examiner

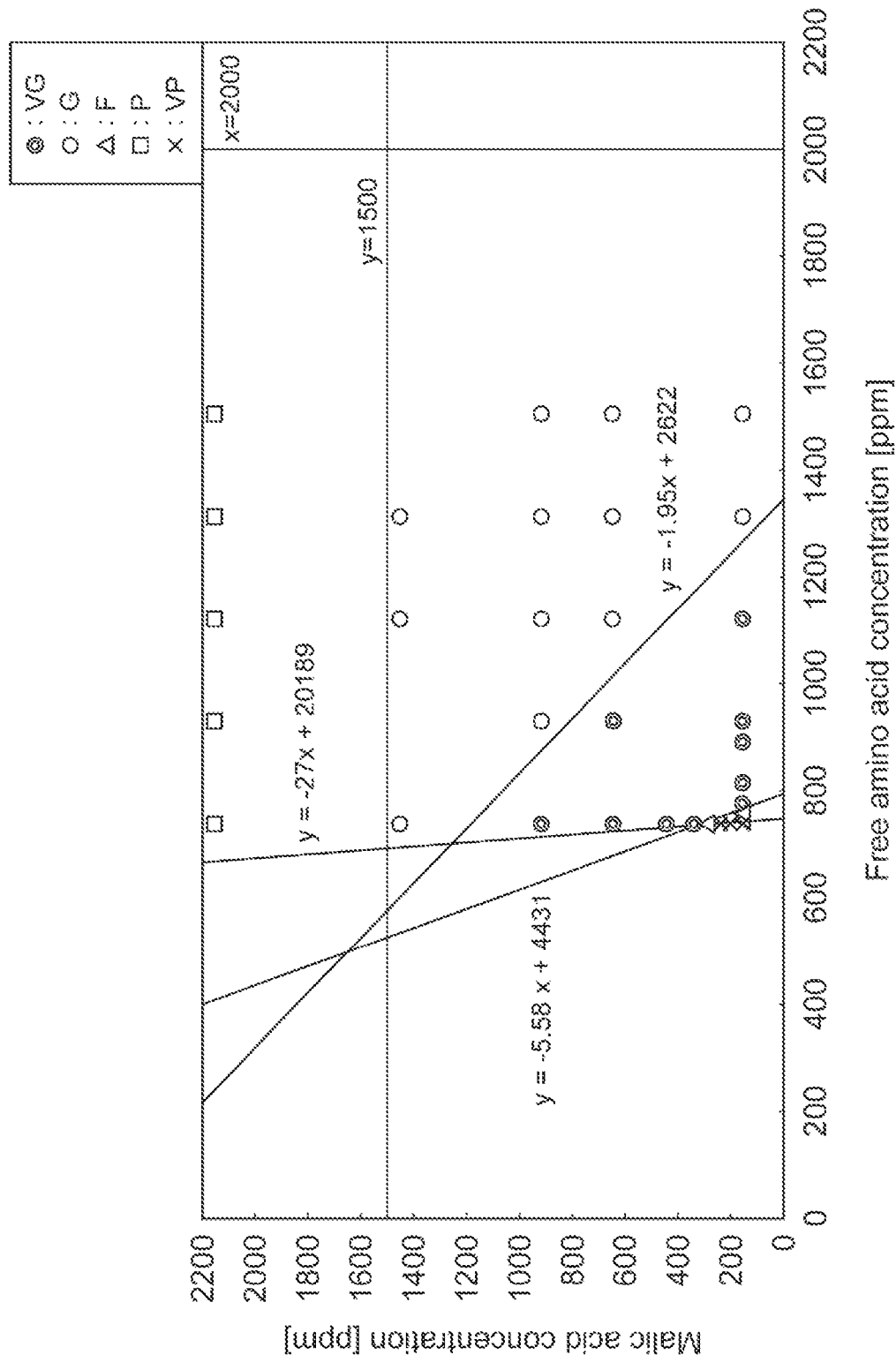

SOLID FERMENTED SOY MILK PRODUCT AND PROCESS FOR MANUFACTURING SAME

TECHNICAL FIELD

The present invention relates to a solid fermented soy milk product and to a process for manufacturing it.

BACKGROUND ART

Soy milk produced by processing soybean is known as a low-calorie, low-cholesterol health food that is also rich in soybean-derived nutrients. There are also known processed soy milk foods (for example, soy milk fermentation products prepared by fermenting soy milk with lactic acid bacteria). Patent literature 1 discloses yogurt prepared by mixing lactic acid bacteria with soy milk.

CITATION LIST

Patent Literature

[Patent literature 1] Japanese Unexamined Patent Application Publication No. 2002-262771.

SUMMARY OF INVENTION

Problems to be Solved by the Invention

Heterofermentative lactic acid bacteria differ from homofermentative lactic acid bacteria that produce lactic acid from sugar, in that they also produce ethanol and carbon dioxide in addition to lactic acid. Thus, heterofermentative lactic acid bacteria have relatively weaker fermentative power than homofermentative lactic acid bacteria. When a solid fermentation product is to be produced using heterofermentative lactic acid bacteria, with soy milk as the starting material, problems have resulted including delayed fermentation and hardening of the fermentation substrate.

It is an object of the present invention to provide a process for manufacturing a solid fermented soy milk product that allows a solid fermented soy milk product to be obtained by fermentation of soy milk with heterofermentative lactic acid bacteria. It is another object of the invention to provide a solid fermented soy milk product produced using the process, and foods and beverages containing the same.

Means for Solving the Problems

The present invention provides a process for manufacturing a solid fermented soy milk product, comprising a fermentation step in which a fermentation substrate containing soy milk and with adjusted malic acid and free amino acid concentrations, is fermented with heterofermentative lactic acid bacteria.

The present inventors have found that it is possible to ferment and solidify a fermentation substrate containing soy milk, even when using heterofermentative lactic acid bacteria, by adjusting the concentration of malic acid and free amino acids in the fermentation substrate. According to the invention, therefore, it is possible to produce a solid fermented soy milk product using heterofermentative lactic acid bacteria. As used herein, the term "solidification" includes the concepts of "gelation" and "solation", and the term "solid" includes the concepts of "gel" and "sol".

The malic acid and free amino acid concentrations may be adjusted so as to satisfy the relationships represented by inequality (1), inequality (2) and inequality (3). This can further minimize formation of air bubbles, water dissociation or cracks and splitting, resulting from excessive fermentation.

$$0 < x \le 2000 \quad (1)$$

$$0 < y \le 1500 \quad (2)$$

$$y \ge -27x + 20189 \quad (3)$$

In these inequalities, y represents the malic acid concentration (ppm by mass), and x represents the free amino acid concentration (ppm by mass). As used herein, "ppm by mass" means $10^{-4}$ mass %.

The malic acid and free amino acid concentrations may be adjusted so as to satisfy the relationships represented by inequality (1), inequality (2), inequality (3) and inequality (4). This will allow production of a solid fermented soy milk product having a more excellent outer appearance.

$$0 < x \le 2000 \quad (1)$$

$$0 < y \le 1500 \quad (2)$$

$$y \ge -27x + 20189 \quad (3)$$

$$y \ge -5.58x + 4431 \quad (4)$$

In these inequalities, y represents the malic acid concentration (ppm by mass), and x represents the free amino acid concentration (ppm by mass).

As used herein, "excellent outer appearance" means that the following conditions (i) to (iv) are satisfied.
(i) No air bubbles, or only a small number of air bubbles.
(ii) No water dissociation, or only a small amount of water dissociation.
(iii) No cracking or splitting, or minimal cracking or splitting.
(iv) Non-gel, non-sol solid.

The malic acid and free amino acid concentrations may also be adjusted so as to satisfy the relationships represented by inequality (3), inequality (4) and inequality (5). This can yield a solid fermented soy milk product without air bubbles, without water dissociation and without cracking or splitting, and which is solid other than gel or sol. That is, this can yield a solid fermented soy milk product with an even more excellent outer appearance.

$$y \ge -27x + 20189 \quad (3)$$

$$y \ge -5.58x + 4431 \quad (4)$$

$$y \le -1.95x + 2622 \quad (5)$$

In these inequalities, y represents the malic acid concentration (ppm by mass), and x represents the free amino acid concentration (ppm by mass). A proviso here is that y>0.

The heterofermentative lactic acid bacteria may be lactic acid bacteria belonging to *Lactobacillus brevis*. *Lactobacillus brevis* has long been known as a lactic acid bacterium used in fermented foods, and its safety in the body has been adequately established. Because of its high safety in the body, the solid fermented soy milk product obtained by this manufacturing process can be ingested continuously for long periods.

The heterofermentative lactic acid bacteria may be one or more strains selected from among *Lactobacillus brevis* SBC8803 (deposit number: FERM BP-10632), *Lactobacillus brevis* SBC8027 (deposit number: FERM BP-10630), Lactobacillus brevis SBC8044 (deposit number: FERM BP-10631), Lactobacillus brevis JCM1061, Lactobacillus brevis JCM1065 and Lactobacillus brevis JCM1170. Using these lactic acid bacteria for the fermentation will not only allow a solid fermented soy milk product to be obtained, but will allow the soy milk odor to be even further reduced, resulting in a solid fermented soy milk product with even greater refreshing quality and more satisfactory flavor.

Lactobacillus brevis SBC8803 is a strain that has been deposited at the International Patent Organism Depositary (IPOD) of the National Institute of Advanced Industrial Science and Technology (Central 6, 1-1, Higashi 1-chome, Tsukuba City, Ibaraki Prefecture, Japan 305-8566) on Jun. 28, 2006, as FERM BP-10632. Throughout the present specification, this strain is also referred to as "strain SBL88".

Lactobacillus brevis SBC8027 was deposited at the International Patent Organism Depositary (IPOD) of the National Institute of Advanced Industrial Science and Technology (Central 6, 1-1, Higashi 1-chome, Tsukuba City, Ibaraki Prefecture, Japan 305-8566) on Jun. 28, 2006, as FERM BP-10630, and Lactobacillus brevis SBC8044 was deposited at the International Patent Organism Depositary (IPOD) of the National Institute of Advanced Industrial Science and Technology (Central 6, 1-1, Higashi 1-chome, Tsukuba City, Ibaraki Prefecture, Japan 305-8566) on Jun. 28, 2006, as FERM BP-10631.

The free amino acid concentration may be adjusted using a product of proteolysis. A product of proteolysis include free amino acids, as well as peptides, proteins and the like. Addition of a product of proteolysis, therefore, promotes fermentation and can shorten the fermentation time.

The product of proteolysis may also be a soybean peptide. This can further promote fermentation and further shorten the fermentation time.

In this manufacturing process, the fermentation substrate may also be fermented by one or more types of lactic acid bacteria selected from the group consisting of Streptococcus thermophilus, Lactobacillus delbrueckii subspecies bulgaricus and Lactobacillus delbrueckii subspecies lactis, in addition to the heterofermentative lactic acid bacteria.

Streptococcus thermophilus, Lactobacillus delbrueckii subspecies bulgaricus and Lactobacillus delbrueckii subspecies lactis are starter lactic acid bacteria very commonly used as yogurt starters. By adding these starter lactic acid bacteria to the fermentation substrate, it is possible to shorten the time for fermentation of the fermentation substrate and solidification.

The invention also provides a solid fermented soy milk product obtained by the production process described above.

The invention further provides foods and beverages containing the solid fermented soy milk product described above. Consumption of such foods and beverages allows efficient ingestion of the soybean-derived nutrients that are abundantly present in soy milk.

Effect of the Invention

According to the invention there is provided a process for manufacturing a solid fermented soy milk product that allows a solid fermented soy milk product to be obtained by fermentation of soy milk with heterofermentative lactic acid bacteria. There is also provided a solid fermented soy milk product obtained by the manufacturing process, and foods and beverages containing them.

BRIEF DESCRIPTION OF DRAWINGS

FIG. 1 is a graph showing the relationship between the malic acid and free amino acid concentrations and the overall evaluation of the obtained solid fermented soy milk product, with single fermentation.

EMBODIMENTS FOR CARRYING OUT THE INVENTION

Embodiments for carrying out the invention will now be explained in more specific detail, with the understanding that the invention is in no way limited to them.

As used herein, "soy milk" means a milk-like beverage obtained by eluting the proteins and other components from soybean with hot water or the like, and removing the fibrous substances. The "soy milk" may be a soy milk having a soybean solid content of 8 mass % or greater. The "soy milk" includes, for example, raw soy milk and unprocessed soy milk.

[Fermentation substrate]

The soy milk content of the fermentation substrate may be 30 mass % or greater, or it may be 50 mass % or greater. If the soy milk content is 50 mass % or greater, it will be possible to obtain a solid fermented soy milk product having even higher nutrition value. There is no particular upper limit on the soy milk content of the fermentation substrate, and it may even consist entirely of soy milk other than the additives used to adjust the malic acid and free amino acid concentrations.

The malic acid concentration of the fermentation substrate may be appropriately adjusted in consideration of the type and amount of heterofermentative lactic acid bacteria used, the fermentation temperature and the fermentation time, and may be between 150 ppm and 1500 ppm, for example. This will allow the fermentation substrate to be more fully solidified.

The malic acid concentration of the fermentation substrate may be between 300 ppm and 1000 ppm. It will thus be possible to obtain a solid fermented soy milk product having a more excellent outer appearance.

There are no particular restrictions on the method of adjusting the malic acid concentration of the fermentation substrate, and for example, it may be direct addition of malic acid, or addition of a squeezed juice of apple, strawberry, pear or plum, or the like.

The free amino acid concentration of the fermentation substrate may be appropriately adjusted in consideration of the type and amount of heterofermentative lactic acid bacteria used, the fermentation temperature and the fermentation time, and may be between 700 ppm and 2000 ppm, for example. Free amino acids are usually obtained by decomposition of the proteins in the fermentation substrate by proteases secreted by lactic acid bacteria. By pre-adjusting the free amino acid concentration of the fermentation substrate, it is possible to accelerate fermentation and shorten the fermentation time, even using lactic acid bacteria with low secretion of proteases (certain Lactobacillus brevis strains), among heterofermentative lactic acid bacteria.

The free amino acid concentration of the fermentation substrate may be 1510 ppm or lower. The free amino acid concentration of the fermentation substrate may be between 770 ppm and 1200 ppm. It will thus be possible to obtain a solid fermented soy milk product having a more excellent outer appearance.

There are no particular restrictions on the method of adjusting the free amino acid concentration of the fermentation substrate, and examples thereof include methods of directly adding free amino acids, methods of adding peptide bond hydrolases to soy milk for hydrolysis of the soy milk, and methods of adding a product of proteolysis containing free amino acids. The method of adjusting the free amino acid concentration of the fermentation substrate may also be a method of adding a product of proteolysis containing free amino acids.

The product of proteolysis may be anyone containing peptides, proteins and the like in addition to free amino acids, and for example, they may be bean-derived peptides, grain-derived peptides, or milk peptides. Examples of beans include soybean, adzuki bean and pea. Examples of grains include wheat, barley, corn, rice, barley, millet seed and millet. The product of proteolysis may be soybean-derived peptides (also "soybean peptides") and wheat-derived peptides (also "wheat peptides"). Examples of soybean peptides include the HINUTE Series (such as HINUTE S, HINUTE AM and HINUTE HK) by Fuji Oil Co., Ltd.

Soybean peptides contain free amino acids as well as abundant peptides, and are more rapidly absorbed in the body than proteins. They also include abundant amounts of vitamins and minerals. By using soybean peptides, therefore, it is possible to not only adjust the free amino acids but also to increase the nutrition value of the produced solid fermented soy milk product.

The malic acid and free amino acid concentrations of the fermentation substrate may be adjusted so as to satisfy the relationships represented by inequality (1), inequality (2) and inequality (3).

$$0<x\leq2000 \quad (1)$$

$$0<y\leq1500 \quad (2)$$

$$y\geq-27x+20189 \quad (3)$$

In these inequalities, y represents the malic acid concentration (ppm by mass), and x represents the free amino acid concentration (ppm by mass).

If the malic acid and free amino acid concentrations of the fermentation substrate satisfy the relationships represented by inequality (1), inequality (2) and inequality (3) above, then it will be possible to ferment and solidify soy milk even using heterofermentative lactic acid bacteria. In addition, it will be possible to suppress denaturation and coagulation of the protein and to suppress water dissociation of the solid fermented soy milk product by becoming an excessively low pH caused by excessive fermentation, while suppressing inclusion of air bubbles in the solid fermented soy milk product and cracking and splitting as well.

The malic acid and free amino acid concentrations of the fermentation substrate may be adjusted so as to satisfy the relationships represented by inequality (1), inequality (2), inequality (3) and inequality (4).

$$0<x\leq2000 \quad (1)$$

$$0<y\leq1500 \quad (2)$$

$$y\geq-27x+20189 \quad (3)$$

$$y\geq-5.58x+4431 \quad (4)$$

In the inequalities, x and y are the same as defined above.

If the malic acid and free amino acid concentrations of the fermentation substrate satisfy the relationship of inequality (4) above, it will be possible to obtain a solid fermented soy milk product which is in neither a gel nor a sol state. Thus, if the malic acid and free amino acid concentrations of the fermentation substrate satisfy the relationships specified by inequality (1), inequality (2), inequality (3) and inequality (4), then it will be possible to obtain a solid fermented soy milk product with a more excellent outer appearance.

The malic acid and free amino acid concentrations of the fermentation substrate may also be adjusted so as to satisfy the relationships represented by inequality (3), inequality (4) and inequality (5).

$$y\geq-27x+20189 \quad (3)$$

$$y\geq-5.58x+4431 \quad (4)$$

$$y\leq-1.95x+2622 \quad (5)$$

In the inequalities, x and y are the same as defined above. A proviso here is that y>0.

If the malic acid and free amino acid concentrations of the fermentation substrate satisfy the relationship of inequality (4) above, it will be possible to obtain a solid fermented soy milk product which is in neither a gel nor a sol state. Moreover, if the malic acid and free amino acid concentrations of the fermentation substrate satisfy the relationship specified by inequality (5) above, it will be possible to minimize air bubbles, water dissociation, cracking and splitting. Thus, by satisfying the relationship specified by inequality (3), inequality (4) and inequality (5), it is possible to obtain a solid fermented soy milk product with an even more excellent outer appearance.

Other additives may also be added to the fermentation substrate. Examples of such additives include sugars (sucrose, maltose, fructose, glucose, stachyose, raffinose and the like), plant extracts (for example, malt extract), aromatics (for example, yogurt flavor), sweeteners (for example, trehalose aspartame, sucralose and acesulfame potassium), starches (for example, potato starch), processed starches (for example, acetylated phosphoric acid crosslinked starch), dextrin, and thickened polysaccharides (for example, guar gum, locust bean gum and pectin).

[Heterofermentative Lactic Acid Bacteria]

Heterofermentative lactic acid bacteria are lactic acid bacteria that produce ethanol and carbon dioxide from sugar, in addition to lactic acid. Examples of heterofermentative lactic acid bacteria include *Lactobacillus* species such as *Lactobacillus fermentum*, *Lactobacillus brevis* and *Lactobacillus reuteri*, *Leuconostoc* species, *Oenococcus* species, *Weissella* species, *Carnobacterium* species and *Lactosphaera* species. The heterofermentative lactic acid bacteria may be of a single type alone, or two or more types in admixture.

These heterofermentative lactic acid bacteria may be lactic acid bacteria belonging to the genus *Lactobacillus*, and more preferably they are lactic acid bacteria belonging to *Lactobacillus brevis*.

The lactic acid bacteria belonging to *Lactobacillus brevis* may be strain SBL88, *Lactobacillus brevis* SBC8027 (deposit number: FERM BP-10630), *Lactobacillus brevis* SBC8044 (deposit number: FERM BP-10631), *Lactobacillus brevis* JCM1061, *Lactobacillus brevis* JCM1065 or *Lactobacillus brevis* JCM1170, because these can produce fermented soy milk beverages having even further reduced soy milk odor, and satisfactory flavor with an even greater refreshing quality. The lactic acid bacteria belonging to *Lactobacillus brevis* may be of a single type alone, or two or more types in admixture.

Incidentally, *Lactobacillus brevis* JCM1061, *Lactobacillus brevis* JCM1065 and *Lactobacillus brevis* JCM1170 can be purchased from a publicly known cell bank such as Riken BioResource Center or JCRB.

There are no particular restrictions on use of the heterofermentative lactic acid bacteria in the fermentation step, and appropriate conditions may be set according to the type of heterofermentative lactic acid bacteria used. When strain SBL88 is used as a heterofermentative lactic acid bacterium, for example, it may be added so that the amount of heterofermentative lactic acid bacteria with respect to the fermentation substrate is $1\times10^4$ to $1\times10^7$ cfu/mL.

[Starter Bacteria]

Other lactic acid bacteria may also be used in combination with the heterofermentative lactic acid bacteria. Such lactic acid bacteria may include yogurt starter lactic acid bacteria (hereunder also referred to as "starter bacteria"), which may be one or more types of lactic acid bacteria selected from the group consisting of Streptococcus thermophilus, Lactobacillus delbrueckii subspecies bulgaricus, and Lactobacillus delbrueckii subspecies lactis. By using the heterofermentative lactic acid bacteria in combination with yogurt starter bacteria, it is possible to shorten the fermentation time.

There are no particular restrictions on the amount of starter bacteria to be used for the fermentation step, and appropriate optimal conditions may bet set depending on the starter bacteria used. While not limitative, the starter bacteria may be added at $1\times10^4$ to $1\times10^7$ cfu/mL with respect to the fermentation substrate, for example.

[Fermentation Step]

The fermentation step is a step in which the fermentation substrate is fermented with heterofermentative lactic acid bacteria. In the fermentation step, the heterofermentative lactic acid bacteria are added to the fermentation substrate, and lactic acid fermentation is carried out by the heterofermentative lactic acid bacteria to obtain a solid fermented soy milk product. The fermentation substrate may also be fermented with starter bacteria in addition to the heterofermentative lactic acid bacteria. The order of addition of the heterofermentative lactic acid bacteria and starter bacteria may be as desired. Also, parallel or isolated double fermentation may be carried out with heterofermentative lactic acid bacteria and starter bacteria.

The fermentation time may be appropriately set according to the conditions, including the type of heterofermentative lactic acid bacteria used, the amount used, the temperature, and the malic acid and free amino acid concentrations of the fermentation substrate. As an example of using strain SBL88 as a heterofermentative lactic acid bacterium, when the malic acid and free amino acid concentrations of the fermentation substrate satisfy the conditions specified by inequality (1), inequality (2) and inequality (3), or when they satisfy the conditions specified by inequality (1), inequality (2), inequality (3) and inequality (4), or when they satisfy the conditions specified by inequality (3), inequality (4) and inequality (5), the fermentation time maybe between 4 hours and 26 hours. The fermentation time may be between 6 hours and 24 hours, between 8 hours and 22 hours, or between 10 hours and 20 hours. If the fermentation time is 10 hours or longer, it will be possible to more thoroughly solidify the soy milk. Also, if the fermentation time is 26 hours or less, it will be possible to prevent over-fermentation and production of air bubbles, water dissociation, cracking, splitting and the like. It will also be possible to reduce the risk of increased production cost and contamination.

When starter bacteria are used in combination therewith, the fermentation time can be shortened. As an example of the fermentation time with combination use, when strain SBL88 is used as a heterofermentative lactic acid bacterium, and the malic acid and free amino acid concentrations of the fermentation substrate satisfy the conditions specified by inequality (1), inequality (2) and inequality (3), or when they satisfy the conditions specified by inequality (1), inequality (2), inequality (3) and inequality (4), or when they satisfy the conditions specified by inequality (3), inequality (4) and inequality (5), the fermentation time maybe between 4 hours and 13 hours.

The fermentation temperature may be appropriately set according to the type of heterofermentative lactic acid bacteria and type of starter bacteria used. Using strain SBL88 as an example of a heterofermentative lactic acid bacterium, the fermentation temperature may be 25 to 35° C., such as 30° C.

[Solid Fermented Soy Milk Product]

The manufacturing process described above allows solidification of soy milk using heterofermentative lactic acid bacteria. The obtained solid fermented soy milk product not only contains the abundant nutrients from soybean, but also has reduced air bubble formation, water dissociation and crazing. Therefore, the solid fermented soy milk product may be used directly as a food or beverage, or it may be used as a food or beverage material.

[Food or Beverage]

A food or beverage of the invention may be the solid fermented soy milk product itself, or a food or beverage containing the solid fermented soy milk product. Examples of foods and beverages that are solid fermented soy milk products themselves include fermented soy milk, yogurt and cheese. Examples of foods and beverages to contain the solid fermented soy milk product include emulsified seasonings (margarine, dressings, mayonnaise and the like), other seasonings (sauces, ketchup and the like), confectioneries (ice cream, candy, caramel, chocolate and the like), and beverages (non-alcoholic beverages, alcoholic beverages and the like).

EXAMPLES

The present invention will now be explained in greater detail based on examples. The production examples shown in Table 1 correspond to Tables 5, 8 and 13, the production examples shown in Table 2 correspond to Tables 6, 9 and 14, and the production examples shown in Table 3 correspond to Tables 7, 10 and 15. The production examples shown in Table 4 correspond to Tables 11 and 12 and 16.

TABLE 1

| | | Malic acid concentration [ppm] | | | | |
|---|---|---|---|---|---|---|
| | | 155 | 647 | 918 | 1452 | 2155 |
| Free amino acid concentration [ppm] | 738 | Prod. Ex. 1 | Prod. Ex. 2 | Prod. Ex. 3 | Prod. Ex. 4 | Prod. Ex. 5 |
| | 930 | Prod. Ex. 6 | Prod. Ex. 7 | Prod. Ex. 8 | — | Prod. Ex. 9 |
| | 1121 | Prod. Ex. 10 | Prod. Ex. 11 | Prod. Ex. 12 | Prod. Ex. 13 | Prod. Ex. 14 |
| | 1313 | Prod. Ex. 15 | Prod. Ex. 16 | Prod. Ex. 17 | Prod. Ex. 18 | Prod. Ex. 19 |
| | 1505 | Prod. Ex. 20 | Prod. Ex. 21 | Prod. Ex. 22 | — | Prod. Ex. 23 |

TABLE 2

| | | Malic acid concentration [ppm] | | | | | | | | |
|---|---|---|---|---|---|---|---|---|---|---|
| | | 155 | 202 | 238 | 288 | 340 | 446 | 647 | 918 | 1452 | 2155 |
| Free amino acid concentration [ppm] | 738 | Prod. Ex. 1 | Prod. Ex. 24 | Prod. Ex. 25 | Prod. Ex. 26 | Prod. Ex. 27 | Prod. Ex. 28 | Prod. Ex. 2 | Prod. Ex. 3 | Prod. Ex. 4 | Prod. Ex. 5 |

TABLE 3

| | Malic acid concentration [ppm] 155 |
|---|---|
| Free amino acid concentration [ppm] | |
| 738 | Prod. Ex. 1 |
| 746 | Prod. Ex. 29 |
| 757 | Prod. Ex. 30 |
| 776 | Prod. Ex. 31 |
| 815 | Prod. Ex. 32 |
| 891 | Prod. Ex. 33 |
| 930 | Prod. Ex. 6 |
| 1121 | Prod. Ex. 10 |
| 1313 | Prod. Ex. 15 |
| 1505 | Prod. Ex. 20 |

TABLE 4

| | | Malic acid concentration [ppm] | | | |
|---|---|---|---|---|---|
| | | 155 | 647 | 918 | 1452 |
| Free amino acid concentration [ppm] | 738 | Prod. Ex. 34 | Prod. Ex. 35 | Prod. Ex. 36 | Prod. Ex. 37 |
| | 930 | Prod. Ex. 38 | Prod. Ex. 39 | Prod. Ex. 40 | Prod. Ex. 41 |
| | 1121 | Prod. Ex. 42 | Prod. Ex. 43 | Prod. Ex. 44 | Prod. Ex. 45 |

[Measurement and Evaluation Methods]

<Malic Acid Concentration Measurement Method>

The malic acid concentration of the fermentation substrate was measured using an organic acid analysis system (Prominence, product of Shimadzu Corp.).

<Free Amino Acid Concentration Measurement Method>

The free amino acid concentration of the fermentation substrate was measured using an amino acid analyzer (L-8800, product of Hitachi High-Technologies Corp.).

<pH Measurement Method>

The pH of the fermentation substrate and fermentation product was measured using a pH meter (IM-55G, product of Toa DKK Corp.).

<Cell Count Measurement Method>

The cell count of SBL88 was measured by the following method. First, 10 to 100 µL of the fermentation substrate or fermentation product, diluted with physiological saline, was sampled and seeded in MRS agar medium containing 15 ppm by mass of iso-alpha acid and subjected to stationary culturing at 30° C. for 48 hours. After culturing, the number of formed colonies were counted and the SBL88 cell count was calculated. Culturing under these conditions is assumed to allow proliferation of SBL88 alone. Thus, the SBL88 count can be measured by counting the number colonies formed.

On the other hand, the count of starter bacteria was measured by the following method. First, 10 to 100 µL of the fermentation substrate or fermentation product, diluted with physiological saline, was sampled and seeded in MRS agar medium containing no iso-alpha acid and stationary cultured at 43° C. for 48 hours. After culturing, the number of formed colonies were counted and the starter cell count was calculated. Culturing under these conditions will presumably allow proliferation of the starter bacteria alone. Thus, the starter cell count can be measured by counting the number colonies formed.

<State Evaluation Method>

A group of evaluators experienced in judging substance states visually evaluated the state (liquid or solid state) of the fermentation product.

<Air Bubble Evaluation Method>

A group of evaluators experienced in judging the presence of air bubbles visually evaluated the presence of any air bubbles in the fermentation product.

<Water Dissociation Evaluation Method>

A group of evaluators experienced in judging the presence of water dissociation visually evaluated the presence of any water dissociation in the fermentation product.

<Cracking or Splitting Evaluation Method>

A group of evaluators experienced in judging the presence of cracking or splitting visually evaluated the presence of any cracking or splitting in the fermentation product.

<Maximum Cell Count Measurement Method>

The maximum cell count was determined by periodic sampling and measurement of the cell count by the method described above, and recording the measurement results for the greatest cell count during the fermentation period.

[Single Fermentation (Production Examples 1 to 33)]

<Starting Materials>

Soy milk: Oishii Unprocessed soy milk (product of Kikkoman Corp.)

Heterofermentative lactic acid bacteria: strain SBL88

Soybean peptide: HINUTE-S (product of Fuji Oil Co., Ltd.)

Malic acid: L-malic acid (product of Sigma Aldrich Japan, KK.)

Sugar: NUFRUCT 55 (product of Showa Sangyo Co., Ltd., high-fructose corn syrup (isomerized sugars containing ≥55% fructose))

<Fermentation Substrate>

The sugars, malic acid and soybean peptide were mixed and melted in the soy milk.

Malic acid was added to the fermentation substrate so as to an added malic acid (without the malic acid in the soy milk) concentration of 0 mass %, 0.0025 mass %, 0.005 mass %, 0.01 mass %, 0.0125 mass %, 0.025 mass %, 0.05 mass %, 0.10 mass %, 0.15 mass % or 0.2 mass % based on the total mass of the fermentation substrate. This allowed the malic acid concentration of the fermentation substrate to be adjusted to 155 ppm, 202 ppm, 238 ppm, 288 ppm, 340 ppm, 446 ppm, 647 ppm, 918 ppm, 1452 ppm or 2155 ppm (all measured values). The malic acid concentration of the fermentation substrate was measured by the method described above.

Soybean peptide was added to the fermentation substrate so as to the soybean peptide concentration of 0 mass %, 0.01 mass %, 0.025 mass %, 0.05 mass %, 0.1 mass %, 0.2 mass %, 0.25 mass %, 0.5 mass %, 0.75 mass % or 1 mass %, based on the total mass of the fermentation substrate. This allowed the free amino acid concentration of the fermentation substrate to be adjusted to 738 ppm, 746 ppm, 757 ppm, 776 ppm, 815 ppm, 891 ppm, 930 ppm, 1121 ppm, 1313 ppm or 1505 ppm (all measured values). The free amino acid concentration of the fermentation substrate was measured by the method described above.

<Fermentation Step>

After sterilizing the fermentation substrate at 80° C. for 60 minutes, it was cooled to 30° C. To this there was added strain SBL88 to $3\times10^6$ cfu/mL, and stationary culturing was carried out at 30° C. The state was then confirmed by the method described above and the time until confirmation of solidification of the fermentation substrate, i.e. the fermentation time to solidification, was measured, with the results shown in Tables 5 to 7. Also, the cell count of strain SBL88 and the pH of the fermentation product, upon confirmation of solidification, were also measured by the method described above, with the results shown in Tables 5 to 7. When no solidification was confirmed, the cell count of strain SBL88 and the fermentation substrate pH from the start of fermentation until 24 hours thereafter were measured by the method described above, with the results shown in Tables 5 to 7.

<Fermentation Product Evaluation>

The presence of any air bubbles, water dissociation, cracking or splitting in the obtained fermentation product, and the time until they were confirmed, were evaluated by the method described above, with the results shown in Tables 8 to 10. Also, the maximum cell count for strain SBL88 and the fermentation time to maximum cell count (listed as "fermentation time" in Table 8 to 10) were evaluated by the methods described above, with the results shown in Tables 8 to 10.

TABLE 5

| | | | Malic acid concentration [ppm] | | | | |
|---|---|---|---|---|---|---|---|
| | | | 155 | 647 | 918 | 1452 | 2155 |
| Free amino acid concentration [ppm] | 738 | Fermentation time and state | 24 hrs Liquid | ≤18 hrs | ≤18 hrs | ≤18 hrs | ≤18 hrs |
| | | pH | 6.12 | 5.59 | 5.64 | 5.75 | 5.89 |
| | | Cell count (cfu/mL) | $7.5 \times 10^7$ | $1.4 \times 10^8$ | $1.5 \times 10^8$ | $1.1 \times 10^8$ | $9.0 \times 10^7$ |
| | 930 | Fermentation time and state | 20 hrs | ≤18 hrs | ≤18 hrs | ND | ≤18 hrs |
| | | pH | 4.69 | 4.96 | 5.14 | | 5.58 |
| | | Cell count (cfu/mL) | $3.6 \times 10^8$ | $1.5 \times 10^8$ | $1.1 \times 10^8$ | | $9.5 \times 10^7$ |
| | 1121 | Fermentation time and state | 20 hrs | ≤18 hrs | ≤18 hrs | ≤18 hrs | ≤18 hrs |
| | | pH | 5.23 | 5.05 | 5.20 | 5.21 | 4.99 |
| | | Cell count (cfu/mL) | $3.6 \times 10^8$ | $2.6 \times 10^8$ | $2.4 \times 10^8$ | $1.5 \times 10^8$ | $3.3 \times 10^8$ |
| | 1313 | Fermentation time and state | ≤18 hrs | ≤18 hrs | ≤18 hrs | ≤18 hrs | ≤18 hrs |
| | | pH | 5.04 | 5.12 | 5.19 | 5.28 | 5.48 |
| | | Cell count (cfu/mL) | $1.2 \times 10^8$ | $1.1 \times 10^8$ | $9.0 \times 10^7$ | $1.5 \times 10^8$ | $3.6 \times 10^8$ |
| | 1505 | Fermentation time and state | ≤18 hrs | ≤18 hrs | ≤18 hrs | ND | ≤18 hrs |
| | | pH | 5.00 | 5.13 | 5.13 | | 4.92 |
| | | Cell count (cfu/mL) | $2.7 \times 10^8$ | $1.5 \times 10^8$ | $9.0 \times 10^7$ | | $3.8 \times 10^8$ |

TABLE 6

| | | | Malic acid concentration [ppm] | | | | | | | | | |
|---|---|---|---|---|---|---|---|---|---|---|---|---|
| | | | 155 | 202 | 238 | 288 | 340 | 446 | 647 | 918 | 1452 | 2155 |
| Free amino acid concentration [ppm] | 738 | Fermentation time and state | 24 hrs Liquid | 24 hrs Liquid | 24 hrs Liquid | 24 hrs Soft gel | 22 hrs | ≤20 hrs | ≤18 hrs | ≤18 hrs | ≤18 hrs | ≤18 hrs |
| | | pH | 6.12 | 5.53 | 5.71 | 5.49 | 5.59 | 5.78 | 5.59 | 5.64 | 5.75 | 5.89 |
| | | Cell count (cfu/mL) | $7.5 \times 10^7$ | $3.1 \times 10^8$ | $1.4 \times 10^8$ | $3.3 \times 10^8$ | $1.4 \times 10^8$ | $1.4 \times 10^8$ | $1.4 \times 10^8$ | $1.5 \times 10^8$ | $1.1 \times 10^8$ | $9.0 \times 10^7$ |

TABLE 7

| Free amino acid concentration [ppm] | | Malic acid concentration [ppm] 155 |
|---|---|---|
| 738 | Fermentation time and state | 24 hrs Liquid |
| | pH | 6.12 |
| | Cell count (cfu/mL) | $7.5 \times 10^7$ |
| 746 | Fermentation time and state | 24 hrs Soft gel |
| | pH | 5.28 |
| | Cell count (cfu/mL) | $2.9 \times 10^8$ |
| 757 | Fermentation time and state | 24 hrs Soft gel |
| | pH | 5.49 |
| | Cell count (cfu/mL) | $8.2 \times 10^8$ |
| 776 | Fermentation time and state | 22 hrs |
| | pH | 5.13 |
| | Cell count (cfu/mL) | $2.7 \times 10^8$ |
| 815 | Fermentation time and state | 20 hrs |
| | pH | 5.09 |
| | Cell count (cfu/mL) | $5.8 \times 10^8$ |
| 891 | Fermentation time and state | 20 hrs |
| | pH | 4.94 |
| | Cell count (cfu/mL) | $6.8 \times 10^8$ |
| 930 | Fermentation time and state | 20 hrs |
| | pH | 4.69 |
| | Cell count (cfu/mL) | $3.6 \times 10^8$ |
| 1121 | Fermentation time and state | 20 hrs |
| | pH | 5.23 |
| | Cell count (cfu/mL) | $3.6 \times 10^8$ |
| 1313 | Fermentation time and state | ≤18 hrs |
| | pH | 5.04 |
| | Cell count (cfu/mL) | $1.2 \times 10^8$ |
| 1505 | Fermentation time and state | ≤18 hrs |
| | pH | 5.00 |
| | Cell count (cfu/mL) | $2.7 \times 10^8$ |

TABLE 8

| | | Malic acid concentration [ppm] | | | | |
|---|---|---|---|---|---|---|
| | | 155 | 647 | 918 | 1452 | 2155 |
| Free amino acid concentration [ppm] | 738 Air bubbles | None | None | None | None | None |
| | Water dissociation | None | None | None | Low (20 hrs) | High (24 hrs) |
| | Cracking and splitting | None | None | None | None | Large cracks (24 hrs) |
| | Maximum cell count (cfu/mL) | $4.6 \times 10^8$ | $4.1 \times 10^8$ | $2.7 \times 10^8$ | $4.9 \times 10^8$ | $1.2 \times 10^8$ |
| | Fermentation time | 20 hrs | 20 hrs | 20 hrs | 20 hrs | 24 hrs |
| | 930 Air bubbles | None | None | None | ND | None |
| | Water dissociation | None | None | Low (22 hrs) | | High (18 hrs) |
| | Cracking and splitting | None | None | None | | Large cracks (18 hrs) |
| | Maximum cell count (cfu/mL) | $3.6 \times 10^8$ | $2.0 \times 10^8$ | $3.7 \times 10^8$ | | $3.7 \times 10^8$ |
| | Fermentation time | 20 hrs | 22 hrs | 24 hrs | | 24 hrs |
| | 1121 Air bubbles | None | None | None | None | Many (18 hrs) |
| | Water dissociation | None | Low (20 hrs) | Low (20 hrs) | Low (20 hrs) | High (18 hrs) |
| | Cracking and splitting | None | None | None | None | None |
| | Maximum cell count (cfu/mL) | $5.5 \times 10^8$ | $2.6 \times 10^8$ | $2.4 \times 10^8$ | $3.6 \times 10^8$ | $5.3 \times 10^8$ |
| | Fermentation time | 24 hrs | 18 hrs | 18 hrs | 22 hrs | 22 hrs |
| | 1313 Air bubbles | None | None | None | None | Many (18 hrs) |
| | Water dissociation | Low (22 hrs) | Low (20 hrs) | Low (20 hrs) | Low (20 hrs) | High (18 hrs) |
| | Cracking and splitting | None | None | None | None | None |

TABLE 8-continued

| | | Malic acid concentration [ppm] | | | | |
|---|---|---|---|---|---|---|
| | | 155 | 647 | 918 | 1452 | 2155 |
| | Maximum cell count (cfu/mL) | $1.6 \times 10^9$ | $1.5 \times 10^8$ | $1.8 \times 10^8$ | $2.8 \times 10^8$ | $3.9 \times 10^8$ |
| | Fermentation time | 24 hrs | 20 hrs | 24 hrs | 24 hrs | 20 hrs |
| 1505 | Air bubbles | None | None | None | ND | Many (18 hrs) |
| | Water dissociation | Low (22 hrs) | Low (22 hrs) | Low (22 hrs) | | High (18 hrs) |
| | Cracking and splitting | None | None | None | | None |
| | Maximum cell count (cfu/mL) | $2.7 \times 10^8$ | $2.0 \times 10^8$ | $2.1 \times 10^8$ | | $3.8 \times 10^8$ |
| | Fermentation time | 24 hrs | 22 hrs | 22 hrs | | 18 hrs |

TABLE 9

| | | | Malic acid concentration [ppm] | | | | | | | | | |
|---|---|---|---|---|---|---|---|---|---|---|---|---|
| | | | 155 | 202 | 238 | 288 | 340 | 446 | 647 | 918 | 1452 | 2155 |
| Free amino acid concentration [ppm] | 738 | Air bubbles | None | None | None | None | None | None | None | None | None | None |
| | | Water dissociation | None | None | None | None | None | None | None | None | Low (20 hrs) | High (24 hrs) |
| | | Cracking and splitting | None | None | None | None | None | None | None | None | None | Large cracks (24 hrs) |
| | | Maximum cell count (cfu/mL) | $4.6 \times 10^8$ | $3.1 \times 10^8$ | $1.4 \times 10^8$ | $3.3 \times 10^8$ | $1.4 \times 10^8$ | $2.0 \times 10^8$ | $4.1 \times 10^8$ | $2.7 \times 10^8$ | $4.9 \times 10^8$ | $1.2 \times 10^8$ |
| | | Fermentation time | 20 hrs | 24 hrs | 24 hrs | 24 hrs | 18 hrs | 16 hrs | 20 hrs | 20 hrs | 20 hrs | 24 hrs |

TABLE 10

| | | | Malic acid concentration [ppm] 155 |
|---|---|---|---|
| Free amino acid concentration [ppm] | 738 | Air bubbles | None |
| | | Water dissociation | None |
| | | Cracking and splitting | None |
| | | Maximum cell count (cfu/mL) | $4.6 \times 10^8$ |
| | | Fermentation time | 20 hrs |
| | 746 | Air bubbles | None |
| | | Water dissociation | None |
| | | Cracking and splitting | None |
| | | Maximum cell count (cfu/mL) | $2.9 \times 10^8$ |
| | | Fermentation time | 24 hrs |
| | 757 | Air bubbles | None |
| | | Water dissociation | None |
| | | Cracking and splitting | None |
| | | Maximum cell count (cfu/mL) | $8.2 \times 10^8$ |
| | | Fermentation time | 24 hrs |
| | 776 | Air bubbles | None |
| | | Water dissociation | None |
| | | Cracking and splitting | None |
| | | Maximum cell count (cfu/mL) | $4.8 \times 10^8$ |
| | | Fermentation time | 24 hrs |
| | 815 | Air bubbles | None |
| | | Water dissociation | None |
| | | Cracking and splitting | None |
| | | Maximum cell count (cfu/mL) | $8.0 \times 10^8$ |
| | | Fermentation time | 24 hrs |
| | 891 | Air bubbles | None |
| | | Water dissociation | None |
| | | Cracking and splitting | None |
| | | Maximum cell count (cfu/mL) | $1.0 \times 10^9$ |
| | | Fermentation time | 24 hrs |
| | 930 | Air bubbles | None |
| | | Water dissociation | None |
| | | Cracking and splitting | None |
| | | Maximum cell count (cfu/mL) | $3.6 \times 10^8$ |
| | | Fermentation time | 20 hrs |
| | 1121 | Air bubbles | None |
| | | Water dissociation | None |
| | | Cracking and splitting | None |
| | | Maximum cell count (cfu/mL) | $5.5 \times 10^8$ |
| | | Fermentation time | 24 hrs |
| | 1313 | Air bubbles | None |
| | | Water dissociation | Low (22 hrs) |
| | | Cracking and splitting | None |
| | | Maximum cell count (cfu/mL) | $1.6 \times 10^9$ |
| | | Fermentation time | 24 hrs |
| | 1505 | Air bubbles | None |
| | | Water dissociation | Low (22 hrs) |

TABLE 10-continued

|  | Malic acid concentration [ppm] 155 |
|---|---|
| Cracking and splitting | None |
| Maximum cell count (cfu/mL) | $2.7 \times 10^8$ |
| Fermentation time | 24 hrs |

[Combined Fermentation (Production Examples 34 to 45)]

<Starting Materials>

Soy milk: Oishii Unprocessed soy milk (product of Kikkoman Corp.)

Heterofermentative lactic acid bacteria: strain SBL88

Starter bacteria: Yomix495LYO (product of Danisco, mixture of *Streptococcus thermophilus* and *Lactobacillus delbrueckii* subspecies *bulgaricus*)

Soybean peptide: HINUTE-S (product of Fuji Oil Co., Ltd.)

Male acid: L-malic acid (product of Sigma Aldrich Japan, KK.)

Sugar: NUFRUCT 55 (product of Showa Sangyo Co., Ltd.)

<Fermentation Substrate>

The fermentation substrate was prepared in the same manner as [Single fermentation] above.

<Fermentation Step>

After sterilizing the fermentation substrate at 80° C. for 60 minutes, it was cooled to 30° C. To this there were added strain SBL88 to $3 \times 10^6$ cfu/mL and the starter bacteria (Yomix495LYO) to $8 \times 10^4$ cfu/mL, and stationary culturing was carried out at 30° C. Next, as in [Single fermentation] above, the fermentation time to solidification and the pH were measured, with the results shown in Table 11. The cell count of strain SBL88 and the cell count of the starter bacteria upon confirmation of solidification were also measured, with the results shown in Table 11.

<Fermentation Product Evaluation>

The presence of any air bubbles, water dissociation, cracking or splitting in the obtained fermentation product, and the time until they were confirmed, were evaluated by the method described above, with the results shown in Table 12. The maximum cell counts of strain SBL88 and the starter bacteria, and the fermentation time until reaching the maximum cell counts, were evaluated by the methods described above, with the results shown in Table 12.

TABLE 11

|  |  |  | Malic acid concentration [ppm] | | | |
|---|---|---|---|---|---|---|
|  |  |  | 155 | 647 | 918 | 1452 |
| Free amino acid concentration [ppm] | 738 | Fermentation time and state | ≤11 hrs | ≤11 hrs | ≤11 hrs | ≤11 hrs |
|  |  | pH | 5.18 | 5.22 | 5.25 | 5.30 |
|  |  | SBL88 Cell count (cfu/mL) | $8.0 \times 10^7$ | $1.0 \times 10^8$ | $9.5 \times 10^7$ | $9.0 \times 10^7$ |
|  |  | Starter cell count (cfu/mL) | $1.4 \times 10^8$ | $1.9 \times 10^8$ | $1.9 \times 10^8$ | $2.1 \times 10^8$ |
|  | 930 | Fermentation time and state | ≤11 hrs | ≤11 hrs | ≤11 hrs | ≤11 hrs |
|  |  | pH | 4.80 | 4.82 | 4.86 | 4.91 |
|  |  | SBL88 Cell count (cfu/mL) | $1.2 \times 10^8$ | $1.2 \times 10^8$ | $8.5 \times 10^7$ | $8.5 \times 10^7$ |
|  |  | Starter cell count (cfu/mL) | $5.5 \times 10^7$ | $7.0 \times 10^7$ | $7.5 \times 10^7$ | $1.6 \times 10^8$ |
|  | 1121 | Fermentation time and state | ≤11 hrs | ≤11 hrs | ≤11 hrs | ≤11 hrs |
|  |  | pH | 4.81 | 4.87 | 4.92 | 4.95 |
|  |  | SBL88 Cell count (cfu/mL) | $8.0 \times 10^7$ | $1.5 \times 10^8$ | $2.0 \times 10^7$ | $7.0 \times 10^7$ |
|  |  | Starter cell count (cfu/mL) | $9.0 \times 10^7$ | $8.0 \times 10^7$ | $7.0 \times 10^7$ | $9.0 \times 10^7$ |

TABLE 12

|  |  |  | Malic acid concentration [ppm] | | | |
|---|---|---|---|---|---|---|
|  |  |  | 155 | 647 | 918 | 1452 |
| Free amino acid concentration [ppm] | 738 | Air bubbles | None | None | None | None |
|  |  | Water dissociation | None | None | None | None |
|  |  | Cracking and splitting | None | None | None | None |
|  | SBL88 | Maximum cell count (cfu/mL) | $1.1 \times 10^8$ | $2.3 \times 10^8$ | $1.0 \times 10^8$ | $9.5 \times 10^7$ |
|  |  | Fermentation time until maximum cell count | 15 hrs | 15 hrs | 17 hrs | 17 hrs |

TABLE 12-continued

| | | | Malic acid concentration [ppm] | | | |
|---|---|---|---|---|---|---|
| | | | 155 | 647 | 918 | 1452 |
| | Starter cell | Maximum cell count (cfu/mL) | $3.3 \times 10^8$ | $4.6 \times 10^8$ | $3.0 \times 10^8$ | $4.2 \times 10^8$ |
| | | Fermentation time until maximum cell count | 17 hrs | 13 hrs | 17 hrs | 17 hrs |
| 930 | Air bubbles | | None | None | Low (11 hrs) | Low (11 hrs) |
| | Water dissociation | | None | None | Low (17 hrs) | Low (17 hrs) |
| | Cracking and splitting | | None | None | None | None |
| | SBL88 | Maximum cell count (cfu/mL) | $1.5 \times 10^8$ | $1.2 \times 10^8$ | $2.3 \times 10^8$ | $2.9 \times 10^8$ |
| | | Fermentation time until maximum cell count | 13 hrs | 11 hrs | 17 hrs | 17 hrs |
| | Starter cell | Maximum cell count (cfu/mL) | $2.7 \times 10^8$ | $2.2 \times 10^8$ | $2.2 \times 10^8$ | $2.7 \times 10^8$ |
| | | Fermentation time until maximum cell count | 17 hrs | 13 hrs | 13 hrs | 17 hrs |
| 1121 | Air bubbles | | None | None | None | None |
| | Water dissociation | | None | None | Low (17 hrs) | Low (17 hrs) |
| | Cracking and splitting | | None | None | None | None |
| | SBL88 | Maximum cell count (cfu/mL) | $5.0 \times 10^8$ | $3.4 \times 10^8$ | $2.9 \times 10^8$ | $3.2 \times 10^8$ |
| | | Fermentation time until maximum cell count | 17 hrs | 17 hrs | 17 hrs | 17 hrs |
| | Starter cell | Maximum cell count (cfu/mL) | $4.4 \times 10^8$ | $4.2 \times 10^8$ | $4.5 \times 10^8$ | $4.7 \times 10^8$ |
| | | Fermentation time until maximum cell count | 17 hrs | 17 hrs | 17 hrs | 17 hrs |

<Overall Evaluation Method>

The obtained solid fermented soy milk products were each given an overall evaluation on the following scale. The results are shown in Tables 13 to 15 (single fermentation) and Table 16 (combined fermentation).

VG: (i) No air bubbles, (ii) no water dissociation, (iii) no cracking or splitting, and (iv) a non-gel, non-sol solid.

G: (i) No air bubbles, or only few air bubbles, (ii) no water dissociation, or only minimal water dissociation, (iii) no cracking or splitting, or only minimal cracking or splitting, and (iv) a non-gel, non-sol solid, but not falling under VG.

F: (i) No air bubbles (ii) no water dissociation, and (iii) no cracking or splitting, but (iv) a very soft gel even after 24 hours of fermentation (a gel that collapsed when tilted).

P: (iv) A solid, but having at least one of the following: (i) numerous air bubbles, (ii) considerable water dissociation, or (iii) cracking or splitting.

VP: Liquid without solidification even after 24 hours of fermentation.

The relationship between the malic acid and free amino acid concentrations and the overall evaluation results, with single fermentation, are shown in FIG. 1.

TABLE 13

| | | Malic acid concentration [ppm] | | | | |
|---|---|---|---|---|---|---|
| | | 155 | 647 | 918 | 1452 | 2155 |
| Free amino acid concentration [ppm] | 738 | VP | VG | VG | G | P |
| | 930 | VG | VG | G | ND | P |
| | 1121 | VG | G | G | G | P |
| | 1313 | G | G | G | G | P |
| | 1505 | G | G | G | ND | P |

TABLE 14

| | | Malic acid concentration [ppm] | | | | | | | | | |
|---|---|---|---|---|---|---|---|---|---|---|---|
| | | 155 | 202 | 238 | 288 | 340 | 446 | 647 | 918 | 1452 | 2155 |
| Free amino acid concentration [ppm] | 738 | VP | VP | VP | F | VG | VG | VG | VG | G | P |

TABLE 15

| | | Malic acid concentration [ppm] 155 |
|---|---|---|
| Free amino acid concentration [ppm] | 738 | VP |
| | 746 | F |
| | 757 | F |
| | 776 | VG |
| | 815 | VG |
| | 891 | VG |

TABLE 15-continued

|  | Malic acid concentration [ppm] |
|---|---|
|  | 155 |
| 930 | VG |
| 1121 | VG |
| 1313 | G |
| 1505 | G |

TABLE 16

|  |  | Malic acid concentration [ppm] | | | |
|---|---|---|---|---|---|
|  |  | 155 | 647 | 918 | 1452 |
| Free amino acid concentration [ppm] | 738 | VG | VG | VG | VG |
|  | 930 | VG | VG | G | G |
|  | 1121 | VG | VG | G | G |

Heterofermentative lactic acid bacteria have been problematic because of their slow fermentation and inability to harden fermentation substrates, but by adjusting the malic acid and free amino acid concentrations of the fermentation substrate (soy milk) it has become possible to achieve sufficient solidification. Furthermore, in the fermentation conditions for these examples, when the malic acid and free amino acid concentrations satisfied the conditions of inequality (1), inequality (2) and inequality (3), the overall evaluation was VG, G or F, and it was possible to further minimize generation of air bubbles, water dissociation, and cracking and splitting. Furthermore, when the malic acid and free amino acid concentrations satisfied the conditions specified by inequality (1), inequality (2), inequality (3) and inequality (4) above, the overall evaluation was VG or G, and it was possible to obtain a solid fermented soy milk product with a more excellent outer appearance. Moreover, when the malic acid and free amino acid concentrations satisfied the conditions specified by inequality (3), inequality (4) and inequality (5) above, the overall evaluation was VG, and it was possible to obtain a solid fermented soy milk product with an even more excellent outer appearance (Production Examples 1 to 33).

Furthermore, by using starter bacteria in combination, it was possible to obtain a solid fermented soy milk product with an excellent outer appearance in a shorter period of time (Production Examples 34 to 45).

The invention claimed is:

1. A process for manufacturing a solid fermented soy milk product, comprising:
fermenting a fermentation substrate comprising soy milk with heterofermentative lactic acid bacteria;
wherein said fermentation substrate further comprises a concentration of malic acid and free amino acids that produces a solid fermented soy milk product from the fermentation substrate by the heterofermentative lactic acid bacteria,
and wherein the malic acid and free amino acid concentrations satisfy the relationships specified by inequality (1), inequality (2) and inequality (3):

$$0 < x \leq 1505 \tag{1},$$

$$0 < y < 1500 \tag{2},$$

$$y \geq -27x + 20189 \tag{3},$$

wherein x represents the free amino acid concentration (ppm by mass) and y represents the malic acid concentration (ppm by mass).

2. The process according to claim 1, wherein the malic acid and free amino acid concentrations further satisfy inequality (4):

$$y \geq -5.58x + 4431 \tag{4}.$$

3. The process according to claim 1, wherein the malic acid and free amino acid concentrations further satisfy the relationships specified by inequality (4) and inequality (5):

$$y \geq -5.58x + 4431 \tag{4},$$

$$y \leq -1.95x + 2622 \tag{5},$$

wherein in inequality (4) and (5) y>0, and
wherein
y represents the malic acid concentration (ppm by mass), and x represents the free amino acid concentration (ppm by mass).

4. The process according to claim 1, wherein the heterofermentative lactic acid bacteria are lactic acid bacteria belonging to Lactobacillus brevis.

5. The process according to claim 4, wherein the heterofermentative lactic acid bacteria are one or more strains selected from the group consisting of Lactobacillus brevis SBC8803 (deposit number: FERM BP-10632), Lactobacillus brevis SBC8027 (deposit number: FERM BP-10630), Lactobacillus brevis SBC8044 (deposit number: FERM BP-10631), Lactobacillus brevis JCM1061, Lactobacillus brevis JCM1065, and Lactobacillus brevis JCM1170.

6. The process according to claim 1, wherein the heterofermentative lactic acid bacteria is strain Lactobacillus brevis SBC8803 (deposit number: FERM BP-10632).

7. The process according to claim 1, wherein the free amino acid concentration is adjusted by addition of a product of proteolysis.

8. The process according to claim 7, wherein the product of proteolysis is soybean peptide.

9. The process according to claim 1, wherein the fermentation substrate is fermented by one or more types of lactic acid bacteria selected from the group consisting of Streptococcus thermophilus, Lactobacillus delbrueckii subspecies bulgaricus and Lactobacillus delbrueckii subspecies lactis, in addition to the heterofermentative lactic acid bacteria.

10. A solid fermented soy milk product produced by the process according to claim 1.

11. A food or beverage containing the solid fermented soy milk product according to claim 10.

12. The process of claim 1, further comprising adding malic acid in excess of that contained in the soy milk in the fermentation substrate.

13. The process according to claim 3, wherein the heterofermentative lactic acid bacteria are lactic acid bacteria belonging to Lactobacillus brevis.

14. The process according to claim 13, wherein the heterofermentative lactic acid bacteria are one or more strains selected from the group consisting of Lactobacillus brevis SBC8803 (deposit number: FERM BP-10632), Lactobacillus brevis SBC8027 (deposit number: FERM BP-10630), Lactobacillus brevis SBC8044 (deposit number: FERM BP-10631), Lactobacillus brevis JCM1061, Lactobacillus brevis JCM1065, and Lactobacillus brevis JCM1170.

15. The process according to claim 3, wherein the heterofermentative lactic acid bacteria is strain Lactobacillus brevis SBC8803 (deposit number: FERM BP-10632).

16. The process according to claim 3, wherein the free amino acid concentration is adjusted by addition of a product of proteolysis.

17. The process according to claim 16, wherein the product of proteolysis is soybean peptide.

18. The process according to claim 3, wherein the fermentation substrate is fermented by one or more types of lactic acid bacteria selected from the group consisting of *Streptococcus thermophilus, Lactobacillus delhrueckii* subspecies *bulgaricus* and *Lactobacillus delhrueckii* subspecies *lactis*, in addition to the heterofermentative lactic acid bacteria.

19. A solid fermented soy milk product produced by the process according to claim 3.

20. A food or beverage containing the solid fermented soy milk product according to claim 19.

* * * * *